(12) United States Patent
Naftali et al.

(10) Patent No.: US 11,606,540 B2
(45) Date of Patent: Mar. 14, 2023

(54) SYSTEM, METHOD AND COMPUTER PROGRAM PRODUCT FOR LASER PROJECTION

(71) Applicant: Maradin Ltd., Yoqne'am (IL)

(72) Inventors: Matan Naftali, Moshav Aloney-Aba (IL); Gad Yearim, Haifa (IL); Ran Gabai, Haifa (IL); Menashe Yehiel, Moshav Yogev (IL); Gil Cahana, Herzelia (IL)

(73) Assignee: MARADIN LTD., Yoqne'am (IL)

( * ) Notice: Subject to any disclaimer, the term of this patent is extended or adjusted under 35 U.S.C. 154(b) by 414 days.

(21) Appl. No.: 16/936,055

(22) Filed: Jul. 22, 2020

(65) Prior Publication Data
US 2021/0029333 A1 Jan. 28, 2021

Related U.S. Application Data

(60) Provisional application No. 62/876,816, filed on Jul. 22, 2019.

(51) Int. Cl.
*H04N 9/31* (2006.01)
*G02B 26/10* (2006.01)
*G02B 26/02* (2006.01)
*G02B 26/08* (2006.01)

(52) U.S. Cl.
CPC ........... *H04N 9/3185* (2013.01); *G02B 26/02* (2013.01); *G02B 26/08* (2013.01); *G02B 26/0833* (2013.01); *G02B 26/101* (2013.01); *G02B 26/105* (2013.01); *H04N 9/3155* (2013.01); *H04N 9/3161* (2013.01); *H04N 9/3164* (2013.01)

(58) Field of Classification Search
CPC ...... H04N 9/31; H04N 9/3102; H04N 9/3108; H04N 9/312; H04N 9/3129; G02B 26/10; G02B 26/101; G02B 26/02; G02B 26/08; G02B 26/0833; G02B 26/104
See application file for complete search history.

(56) References Cited

U.S. PATENT DOCUMENTS

| 9,456,172 | B2 | 9/2016 | Naftali et al. |
| 9,769,444 | B2 | 9/2017 | Naftali et al. |
| 10,277,873 | B2 | 4/2019 | Naftali et al. |
| 10,897,601 | B2 * | 1/2021 | Chatterjee ............ G02B 26/105 |

(Continued)

OTHER PUBLICATIONS

Tan, et al., Foveated imaging for near-eye displays, Optics Express, Sep. 17, 2018, pp. 1-10, vol. 26, No. 19.

(Continued)

*Primary Examiner* — William C. Dowling
(74) *Attorney, Agent, or Firm* — Browdy and Neimark, PLLC

(57) ABSTRACT

A system for controlling laser drivers of lasers, incorporated into optical devices which seek to provide e.g. project laser images including at least one laser image whose pixels are non-uniformly distributed, the system comprising memory which stores desired pixel location data; and a location-to-time converter e.g. hardware processor configured by software or firmware, which is configured to translate the desired pixel location data into time stamps and which, when embedded into an optical device which incorporates a laser having a laser driver, communicates the time stamps to the laser driver.

21 Claims, 8 Drawing Sheets

(56) References Cited

U.S. PATENT DOCUMENTS 11,353,559 B2 * 6/2022 Campbell ............. G01S 17/931
2022/0291385 A1 * 9/2022 Honda ................. G01S 7/4817

OTHER PUBLICATIONS

Tan, et al., Near-eye Foveated Display for Achieving Human Visual Acuity, In SID Symposium Digest of Technical Papers, 2019, pp. 624-627, vol. 50. No. 1.
Wikipedia, Lidar, en.wikipedia.org/w/index.php?title=Lidar&oldid=906703309, Nov. 15, 2020, pp. 1-31.
Wikipedia, Position Sensitive Device, en.wikipedia.org/w/index.php?title=Position_sensitive_device&oldid=790228440, Nov. 15, 2020, pp. 1-4.

* cited by examiner

Fig. 7

| J | T_UXNY (i,j) | SX (i,j) | T_NU (i,j) |
|---|---|---|---|
| 0 | 100.0 | 0.0 | 100.0 + 0.0 × (104.2 − 100.0) = 100.0 |
| 1 | 104.2 | 0.7 | 100.0 + 0.7 × (104.2 − 100.0) = 102.9 |
| 2 | 106.3 | 1.2 | 104.2 + 0.2 × (106.3 − 104.2) = 104.6 |
| 3 | 107.6 | 2.5 | 106.3 + 0.5 × (107.6 − 106.3) = 107.0 |
| 4 | 109.1 | 4.1 | 109.1 + 0.1 × (112.7 − 109.1) = 109.5 |
| 5 | 112.7 | 4.8 | 109.1 + 0.8 × (112.7 − 109.1) = 112.0 |

SYSTEM, METHOD AND COMPUTER PROGRAM PRODUCT FOR LASER PROJECTION

REFERENCE TO CO-PENDING APPLICATIONS

Priority is claimed from U.S. Provisional Patent Application No. 62/876,816 "System And Method For Laser Projection Using A Micro-Mirror MEMS", filed on 22 Jul. 2019, the disclosure of which application/s is hereby incorporated by reference.

FIELD OF THIS DISCLOSURE

The present invention relates generally to lasers and more particularly to laser control.

BACKGROUND FOR THIS DISCLOSURE

Known methods for creating a limited version of non-uniform projection (e.g., G. Tan et al, NEAR-EYE FOVEATED DISPLAY FOR ACHIEVING HUMAN VISUAL ACUITY. (2018), Optics Express. 26—pubmed.ncbi.nlm.nih.gov/30469615/) involve a complex set of hardware and results in a two stated pixels density. (SID 2019 digest)

Many optical devices include lasers.

For example, Lidar (e.g. "light detection and ranging" or "laser imaging, detection, and ranging" or 3-D laser scanning) is a technology for measuring distances (ranging) by illuminating a target using a laser light source, measuring reflection from the target with a sensor, and using differences in laser return times and wavelengths to generate digital 3-D representations of the target. terrestrial, airborne, and mobile Lidar applications may be used to generate high-resolution maps. Use-cases include "surveying, geodesy, geomatics, archaeology, geography, geology, geomorphology, seismology, forestry, atmospheric physics, laser guidance, airborne laser swath mapping (ALSM), laser altimetry" and control and navigation e.g. for autonomous vehicles, according to Wikipedia.

A dimming system, which may be used in conjunction with embodiments herein e.g. as described below, is described in co-owned U.S. Pat. No. 10,277,873. This system may include all or any subset of the embodiments described and claimed in '873, such as:

"1. A method for providing a dimming factor of N using a laser display device having plural colored laser diodes each generating a colored laser beam according to control parameters, the method comprising:
varying at least one of said control parameters of at least one of said laser diodes, wherein said at least one of said control parameters is operative to reduce intensity of at least one of the colored laser beams,
wherein said varying comprises:
providing a dimming factor of m<N using first laser diode data current control apparatus characterized by its ability to provide m<N dimming levels; and
providing a dimming factor of at least N/m but less than N, using a laser diode data current control apparatus set including at least a second laser diode data current control apparatus and characterized by its ability to provide a dimming factor of at least N/m, but less than N.
2. A method according to claim 1, wherein at least one of the laser diode data current control apparatus includes Data Reference DAC gain control.
3. A method according to claim 2, wherein when reducing reference DAC gain for each of plural color channels, resulting pixel data is multiplied by a color-channel specific correction factor gain CF pre-computed to maintain white balance between said channels.
4. A method according to claim 1, wherein the first and second laser diode data current control apparatus include laser pixel width control and Data Reference DAC gain control.
5. A method according to claim 4, wherein the laser diode data current control apparatus set also includes laser pixel data division.
6. A method according to claim 1, further comprising providing N dimming levels using a laser display device, including:
receiving, in real time, a stream of desired dimming levels from among the N dimming levels; and
achieving each desired dimming level in the stream in real time, including using a first laser diode data current control apparatus characterized by its ability to provide a dimming factor of m<N and a laser diode data current control apparatus set including at least a second laser diode data current control apparatus and characterized by its ability to provide a dimming factor of at least N/m, but less than N.
7. A method according to claim 1, wherein at least one of the laser diode data current control apparatus includes laser pixel width control.
8. A method according to claim 7, wherein laser pixel width control is achieved by reducing a number of clocks per laser pixel.
9. A method according to claim 1, wherein said plural colored laser diodes comprise a red laser diode, a green laser diode and a blue laser diode.
10. A system for providing a dimming factor of N using a laser display device having plural colored laser diodes each generating a colored laser beam according to control parameters, the system comprising:
apparatus for varying at least one of said control parameters of at least one of said laser diodes, wherein said at least one of said control parameters is operative to reduce intensity of at least one of the colored laser beams,
wherein said apparatus for varying comprises:
a controller operative for providing a dimming factor of m<N using first laser diode data current control apparatus characterized by its ability to provide m<N dimming levels; and providing a dimming factor of at least N/m but less than N, using a laser diode data current control apparatus set including at least a second laser diode data current control apparatus and characterized by its ability to provide a dimming factor of at least N/m, but less than N.
11. The system according to claim 10, wherein the first and second laser diode data current control apparatus include laser pixel width control and Data Reference DAC gain control.
12. The system according to claim 11, wherein the laser diode data current control apparatus set also includes laser pixel data division.
13. The system according to claim 10, wherein at least one of the laser diode data current control apparatus includes Data Reference DAC gain control.
14. The system according to claim 10, wherein at least one of the laser diode data current control apparatus includes laser pixel width control.
15. The system according to claim 14, wherein laser pixel width control is achieved by reducing a number of clocks per laser pixel.
16. The system according to claim 10, wherein said plural colored laser diodes comprise a red laser diode, a green laser diode and a blue laser diode."

Methods for measuring or quantifying or defining pixel density are known, such as for example by measuring the distance between a pixel and its horizontal and vertical neighbor pixels, and summing these distances. High pixel density is then defined by a lower value, and lower pixel density by a higher value.

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments seek to provide a system, method and computer program product for laser projection which may be via a micro-mirror MEMS.

Certain embodiments seek to provide time stamps suitable for driving a laser beam, so a resulting projected image appears on the projected plane with uniform brightness.

Certain embodiments seek to provide firmware in which may be implemented any of the algorithms or processing operations shown and described herein.

Certain embodiments seek to provide circuitry or logic or a hardware processor, configured to perform at least one of the operations herein.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented as appropriate.

The following terms may be construed either in accordance with any definition thereof appearing in the prior art literature or in accordance with the specification, or to include in their respective scopes, the following:

Projection area: may include total projected area or surface (e.g. projection plane aka projected plane), on which an image is projected.

Image: may include L lines and P pixels per line line: may include a horizontal line which is deployed in a vertical position $SX(i,j)$ may include a function representing a horizontal position of pixel j in line i, typically SX data includes non-uniform horizontal positions of pixels within image lines $SY(i)$=a function representing a vertical position of line i, typically SY data includes non-uniform vertical positions of image lines. This function may control the micro-mirror vertical driving circuit to position each projected line at the vertical position, within the projected plane that has been requested.

positioning tables: may store $SY(i)$ and $SX(i,j)$ values.

Time stamps $T\_U(i,j)$: may include time stamps for a uniform projector (e.g. assuming a "uniform projection use-case" in which pixels are to be distributed over the projection plane uniformly along both vertical and horizontal axes). A time stamp may be defined in the time domain as the time to project pixel (i,j)–pixel j in line i.

uniform timing table (or uniform projection time stamp table): may include a table of $T\_U(i,j)$ values which may be generated by the $1^{st}$ module in diagram E, using operation 50 in co-owned U.S. Pat. No. 9,456,172 which describes a uniform projection process. Defines times at which to project each of P pixels in each of L lines, for uniform projection use-cases.

time stamps $T\_UXNY(i,j)$ may include "uniform in X, non-uniform in Y" time stamps for uniform horizontal position in non-uniform vertical position, e.g. as defined by $SY(i)$.

The time stamps typically determine a time for projecting on non uniform vertical position according to $SY(i)$, whereas horizontally the pixels are spread uniformly. However typically, this is only an intermediate computation or partial result, and is not used in practice to trigger the laser diode.

In other words: $T\_UXNY(i,j)$ defines time stamps at which to project each of P pixels in each of L lines, for non-uniform vertical projection according to $SY(i)$ but uniform horizontal projection.

First (vertical) non-uniform projection/timing table: may include a table of $T\_UXNY(i,j)$ values which may be derived by $2^{nd}$ module in diagram E, from $SY(i)$ and $T\_U(i,j)$ values received from module 1.

$T\_NU(i,j)$ may include horizontal non-uniform time stamp for pixel-timing, or for non-uniform horizontal position for each image line i pixel j which may be derived by the 3rd module in diagram E, from $SX(i,j)$ and $T\_UXNY(i,j)$ values received from module 2. the values in the table may, inter alia, define times at which to project first pixel in each of L lines, for non-uniform projection use-case.

Typically, $T\_NU(i,j)$ are final time stamps for each pixel j in each line i; these may be generated by horizontal non-uniform timing computation functionality e.g. as described herein. This time table may be used to trigger the laser diode so as to yield non-uniform projection in vertical and horizontal directions, as desired.

Second (horizontal) non-uniform projection/timing table: may include a table of $T\_NU(i,j)$ values, for all i, j pixels in the image.

It is appreciated that any reference herein to, or recitation of, an operation being performed is, e.g. if the operation is performed at least partly in software and/or at least partly in hardware, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention typically includes at least the following embodiments:

Embodiment 1

A system for controlling laser drivers of lasers, incorporated into optical devices which seek to provide e.g. project laser images including at least one laser image whose pixels are non-uniformly distributed, the system comprising:

memory which stores desired pixel location data; and/or a location-to-time converter (e.g. a hardware processor configured by software or firmware) which is configured to translate the desired pixel location data into time stamps and, e.g. when embedded into an optical device which incorporates a laser having a laser driver, communicates the time stamps to the laser driver.

Embodiment 2

The system of any of the preceding embodiments and also comprising an API which allows an end-user/manufacturer of the optical device to upload desired pixel location data into the memory.

According to an embodiment of the invention, each instance of the system includes an API and each instance is calibrated or fine-tuned, typically when that instance is embedded or incorporated into a specific instance of an optical device, including generating individual, per-instance desired pixel location data for that instance which may differ from desired pixel location data initially stored, e.g. as a default, in the memory. This is suitable inter alia when the manufacturing tolerance for the optical devices is relatively large, such that different instances of the optical device can vary significantly.

According to an embodiment of the invention, an instance of the system includes an API and that instance is calibrated or fine-tuned, typically when that instance is embedded or incorporated into a specific instance of an optical device. This calibration generates new desired pixel location data which may differ from desired pixel location data initially stored, e.g. as a default, in the memory. A run of instances of the system is then manufactured, in all of which the new desired pixel location data is stored in memory. This is suitable inter alia when the manufacturing tolerance for the optical devices is relatively small, such that different instances of the optical device are not expected to vary significantly, such that if the new desired pixel location data, based on one (or several) instances of the optical device, is stored in memory, it is not necessary to calibrate or fine-tune each manufactured instance of the optical device.

Embodiment 3

The system of any of the preceding embodiments wherein the location-to-time converter is configured to support projecting 2D images on m-dimensional surfaces using a laser beam and a micro-mirror pivoting in two axes x and y, where x is the pivoting mirror's high speed axis presenting a projected line and y is the pivoting mirror's lower speed axis that moves the projection from line to line, including activating the laser at times defined by time stamps to project at least one image's pixels onto a surface, thereby to yield a projected image which is non-distorted, and wherein the location-to-time converter is configured for determining pixel timing according to which pixels are projected.

Embodiment 4

The system of any of the preceding embodiments wherein the system also comprises functionality configured to compute pixel density from pixel position and a pixel density-to-laser driver current intensity converter (hardware processor configured by software or firmware) which is configured to translate pixel data and the pixel density into laser driver current intensity values which control the current intensity generated by the laser driver at each timestamp.

Embodiment 5

The system of any of the preceding embodiments wherein the memory stores at least one default set of desired pixel location data, thereby to facilitate trial-and-error based calibration.

Embodiment 6

The system of any of the preceding embodiments and also comprising a user interface which includes a virtual button via which the end-user determines whether the time stamp-to-laser driver current intensity converter should or should not be activated.

Embodiment 7

The system of any of the preceding embodiments wherein the time stamp-to-laser driver current intensity converter is configured for projecting an image, including a matrix of pixels I,j, on a total projected area or surface (e.g. projection plane), such that distances between horizontally and/or vertically consecutive pixels are not uniform, thereby to provide first and second areas within the total projected area, wherein the first areas are more sparsely populated with pixels than the second areas which are more densely populated with pixels, and wherein the total projected area is, e.g. selectably, illuminated with a uniform brightness level, including providing levels of laser current for pixels in the first, sparely populated, areas which are higher than levels of laser current for pixels in the second, densely populated, areas, which are dimmer.

Embodiment 8

The system of any of the preceding embodiments wherein the optical devices may for example include at least one of the following group of optical devices:
pico-projector
laser headlights, e.g. for cars
Head Up Display e.g. for humans driving vehicles or operating machinery
Smart glasses
A Lidar system.

Embodiment 9

The system of any of the preceding embodiments wherein the determining pixel timing includes generating a matrix of the time stamps, the determining including:
receiving geometry data and projection resolution data and generating a uniform timing table;
performing a vertical non-uniform computation which receives the uniform timing table, and SY data which includes non-uniform vertical positions of image lines and, accordingly, computes time stamps, T_UXNY(i,j), for uniform horizontal position in non-uniform vertical position.

Embodiment 10

The system of any of the preceding embodiments wherein the determining pixel timing also includes performing a horizontal non-uniform computation which receives the time stamps, T_UXNY(i,j) and SX data, including non-uniform horizontal positions of image lines and, accordingly, computes time stamps, T_NU(i,j), for non-uniform horizontal position for each pixel in each image line.

Embodiment 11

The system of any of the preceding embodiments wherein the laser driver current intensity values are fed directly to the laser driver.

Embodiment 12

A method for controlling laser drivers of lasers, incorporated into optical devices which seek to provide laser images including at least one laser image whose pixels are non-uniformly distributed, the method comprising:
providing memory which stores desired pixel location data; and
providing logic configured for translating the desired pixel location data into time stamps and, when the logic is embedded into an optical device which incorporates a laser having a laser driver, for communicating the time stamps to the laser driver.

Embodiment 13

A computer program product, comprising a non-transitory tangible computer readable medium having computer readable program code embodied therein, the computer readable program code adapted to be executed to implement a method for controlling laser drivers of lasers, incorporated into optical devices which seek to provide laser images including at least one laser image whose pixels are non-uniformly distributed, the method comprising:
providing memory which stores desired pixel location data; and
providing logic configured for translating the desired pixel location data into time stamps and, when the logic is embedded into an optical device which incorporates a laser having a laser driver, for communicating the time stamps to the laser driver.

Embodiment 14

The system of any of the preceding embodiments wherein the location-to-time converter configured for determining the pixel timing is configured for generating time stamps to be used to determine a time for projecting a desired non uniform vertical position SY(i), where pixels are spread uniformly along a horizontal direction, thereby to yield interim time stamps at which to project each of P pixels in each of L lines, for non-uniform vertical projection according to SY(i) with uniform horizontal projection.

According to some embodiments, an algorithm or process may be provided to generate interim time stamps (e.g. T_UXNY (i,j)) and may be based on a uniform time stamps matrix T_U(i,j) and/or a vertical position table SY(i) and may receive one or both of these as inputs and may derive the interim time stamps therefrom.

According to some embodiments, final time stamps (e.g. T_NU(i,j)) for each pixel j in line i, may be derived inter alia from the interim time stamps (e.g. T_UXNY(i,j)) inter alia. The final time stamps for each pixel j in line I may be used to trigger a laser diode to yield desired non uniform projection in vertical and horizontal directions.

Embodiment 15

The system of any of the preceding embodiments wherein final time stamps T_NU(i,j) for each pixel j in line i, are derived from at least one of a function e.g. an SX(i,j) function which defines pixel j positions in line i and the interim time stamps e.g. T_UXNY(i,j).

Typically, the T_NU(i,j) time stamps define final time stamps for each pixel j in line i which may be used to trigger a laser diode to yield desired non uniform projection in vertical and horizontal directions.

Embodiment 16

The system of any of the preceding embodiments wherein the SX data yields L×P position values where L is the number of lines, and wherein the SX data is stored in a compressed form.

An example compressed economical form with reduced storage size, relative to uncompressed storage, is using a profile including a monotonically increasing profile function SPX(i,k) of K points for each of the L lines and wherein the P position values for each line, are interpolated from the K profile points for that line.

Embodiment 17

A system according to any of the preceding embodiments, providing (e.g. selectably) non uniform projection in an X direction which includes an identical non-uniform function for all lines in at least one laser image.

Embodiment 18

A system according to any of the preceding embodiments, providing (e.g. selectably) a Non uniform projection in X direction which includes a different non-uniform function for every line in at least one laser image.

Embodiment 19

A system according to any of the preceding embodiments, providing (e.g. selectably) a non-uniform projection in X direction wherein the at least one laser image includes plural images defining plural frames respectively and wherein an identical non-uniform function or different non-uniform functions is/are employed for every line in at least one laser image which change/s from frame to frame.

Embodiment 20

A system according to any of the preceding embodiments, providing (e.g. selectably) a non-uniform projection in a Y direction which includes a different non-uniform function for every frame.

Embodiment 21

A system according to any of the preceding embodiments wherein, e.g. selectably, at least one laser image is projected at a uniform brightness, such that all areas of the image appear uniformly bright regardless of pixel density, the system being configured for one or both of the following operations: Achieving uniform brightness by providing an increased brightness level for at least one pixel in the at least one laser image; and
Achieving uniform brightness by dimming at least one pixel in the at least one laser image.

Also provided, excluding signals, is a computer program comprising computer program code means for performing any of the methods shown and described herein when the program is run on at least one computer, and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs) or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system illustrated or described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein, which may, for example, include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "UI" as used herein includes also the underlying logic which controls the data presented to the user e.g. by the system display and receives and processes and/or provides to other modules herein 5656, data entered by a user e.g. using her or his workstation/device.

BRIEF DESCRIPTION OF THE DRAWINGS

Example embodiments are illustrated in the various drawings. Specifically:

FIG. 7 is a table useful in understanding certain embodiments.

Figure 1:
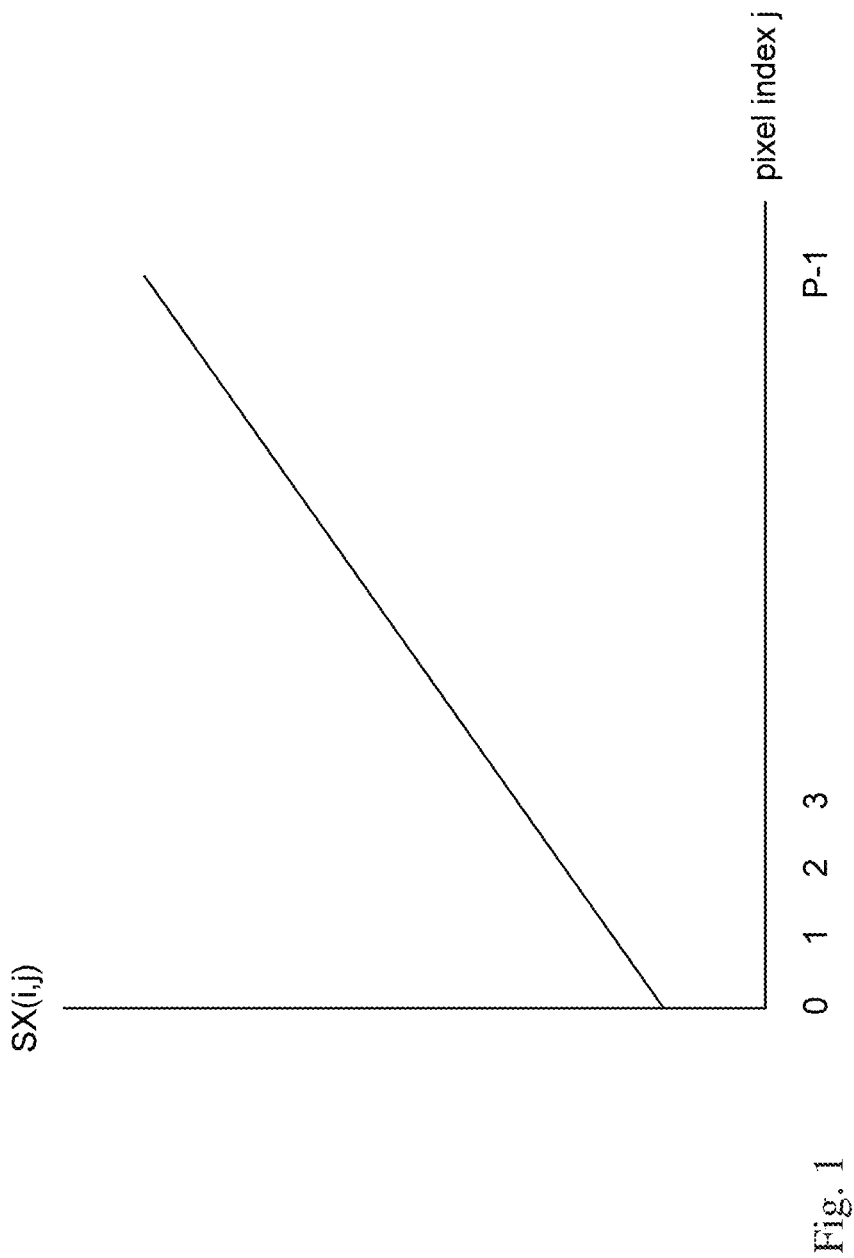
FIG. 1 aka Diagram A is a graph illustration of a function SX(i,j) for line i pixel j for uniform projection. Typically SX(i,j)=a function representing a horizontal position of pixel j in line i, and may be provided in addition to SY(i), a function representing a vertical position of line i which may be a vertical coordinate of a line i.

Certain embodiments of the present invention are illustrated in the drawings; in the block diagrams, arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include any subset or all of the functional blocks shown or described in the specifically illustrated or described implementations by way of example, in any suitable order e.g. as shown. Flows may include all or any subset of the illustrated or described operations, suitably ordered e.g. as shown. tables herein may include all or any subset of the fields and/or records and/or cells and/or rows and/or columns described.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer, or more generally by a suitable microprocessor, configured in accordance with the methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DSP or any suitable combination thereof.

Any hardware component mentioned herein may, in fact, include either one or more hardware devices e.g. chips, which may be co-located, or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments seek to provide improved non-uniform projection of image/s using Laser projection in general and by micro-mirror MEMS in particular. Such non-uniform projection of images is advantageous inter alia as an enabler for generating "fovea like" displays for different applications including ARNR.

U.S. Pat. No. 9,769,444 (patents.google.com/patent/US9456172B2/en), co-owned, whose disclosure is hereby incorporated herein by reference in its entirety, presents a method to project 2D images on m-dimensional surfaces using a laser beam and a micro-mirror pivoting in two axes. The method generates a matrix of time stamps (Operation 50 in U.S. Pat. No. 9,769,444), from high speed clock with cycle time DeltaT, such that if the laser is activated at these time stamps to project the pixels of a video (or any image) frame, the projected image will be non-distorted, and the distance between every two consecutive pixels on a 2D plane will appear to be constant.

In U.S. Pat. No. 9,769,444, DeltaT is typically selected small enough to make the dense grid projected on the 2D plane (Grid II in operation 30 in U.S. Pat. No. 9,769,444) as close as possible to the virtual sparse grid on the 2D plane (Grid III in operation 40 in U.S. Pat. No. 9,769,444)—which will make the projected sparse grid on the 2D plane (Grid IV in operation 50 in U.S. Pat. No. 9,769,444) as close to uniform as possible with minimum error.

Uniform Projection

The projected image on the 2D plane may have two axes X and Y. X is the pivoting mirror's high speed axis presenting a projected line. Y is the pivoting mirror's lower speed axis that moves the projection from line to line. X and Y axes are also referred as horizontal and vertical axes, respectively. If i is the line index (i=0, 1, . . . , L−1) and j is the pixel index (j=0, 1, . . . , P−1), where L is the number of lines and P in the number of pixels in a line, the time stamp matrix for uniform projector is defined as $T\_U(i,j)$.

If $X(t)$ is the projection point in time t on a 2D plane, uniform projection on the 2D plane using $T\_U(i,j)$ time stamp matrix may satisfy:

$$X[T\_U(i,j)]-X[T\_U(i,j-1)]=XU+err,$$

for i=0, 1, . . . L−1; j=1, 2 . . . , P−1; abs(err)<max dX

XU is a constant distance value, representing the uniform distance between every two consecutive pixels in X direction on all the lines. dX is the distance on the 2D plane in X direction between two consecutive dense grid projection points (Grid II in the above-referenced patent e.g. patent '172). Reducing dX distance typically reduces the error. This can be done by increasing dense grid frequency, which typically will decrease DeltaT. Dense grid frequency is called high speed clock frequency.

For uniform projection, the distance between every two consecutive lines is constant:

$$Y[\text{line}i]-Y[\text{line}(i-1)]=YU, i=1,2,\ldots,L-1$$

YU is a constant value, representing the distance between every two consecutive lines.

Non-Uniform Projection:

Projection can be non-uniform in the x direction, in the y direction, or in both.

This type of projection may be useful when projecting on a non-planar surface, or when aspect ratio of video source does not match the aspect ratio of the projector, or when generating special effects to the projected video is desired.

Non-uniform projection in the X direction means that the distance between two consecutive pixels in a line is not constant.

Conventional methods are not well-suited for non-uniform projection using standard display technologies (e.g., LCOS, LCD, DLP). Suggested methods for creating a limited version of non-uniform projection (e.g., Tan et al. (2018). Optics Express. 26) involves a complex set of hardware and results in a two stated pixels density. Other alternatives suggest to reduce projection effective resolution in order to reset pixels location on screen. Certain embodiments of the invention are configured to, inter alia, provide non-uniform projection using standard laser projection hardware without compromising image resolution.

Figure 2:
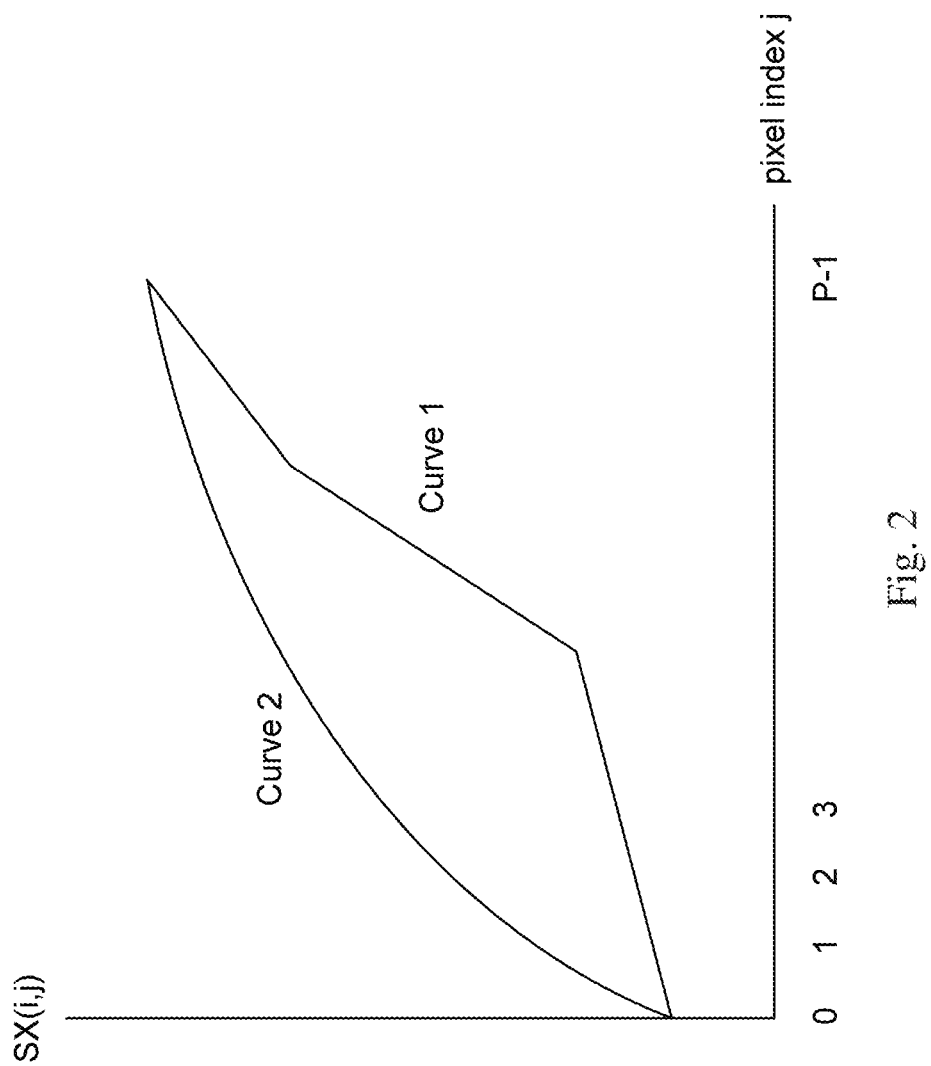
FIG. 2 aka Diagram B is a graph illustration of two examples of function SX(i,j) for line i pixel j for non-uniform projection.

If SX(i,j) is a function representing a horizontal position of pixel j in line i, than, a straight line e.g. as in FIG. 1, aka Diagram A, defines uniform horizontal projection, and any other line is non-uniform horizontal projection. diagram B shows examples of two non-uniform SX(i,j) functions (curves 1, 2 in FIG. 2, aka diagram B).

At least the following scenarios or use-cases may occur, for horizontal non-uniform projection:
1. Non-uniform projection in X direction is identical non-uniform function SX(i,j) for all the lines.

$$SX(0,j)=SX(1,j)=\ldots=SX(L-1,j); j=0,1,\ldots,P-1;$$

L=number of lines
P=number of pixels per line
2. Non-uniform projection in X direction can be different non-uniform function SX(i,j) for each line, keeping the same number of pixels per line.

$$SX(0,j) \neq SX(1,j) \neq \ldots \neq SX(L-1,j); j=0,1,\ldots,P-1;$$

3. Non-uniform projection function in X direction is different from line to line, and the number of pixels per line can be different from line to line.
4. Non-uniform projection function in X direction is different from frame to frame.

Non-uniform projection in the Y direction means that the distance between two consecutive lines is not constant and lines are separated non-uniformly.

Assume SY(i); i=0, 1, . . . , L−1 is a table (or a function) of vertical positions of L lines, defining for each projected line i its vertical position SY(i) in the uniform grid of L lines. This table (or function) represents a function that can control the micro-mirror vertical driving circuit, so each projected line is placed in the projected plane at the requested vertical position. As in the X direction, non-uniform projection in Y direction may be changed from frame to frame as well.

SY(i) as well as the SX(i,j) functions (or tables) define the non-uniform projection position in X and Y directions. They define the position of each pixel in the projection plane. These functions are generated by the user. The functions are either stored in the projection control system, or transmitted to the control system via the communication channel.

Figure 3:
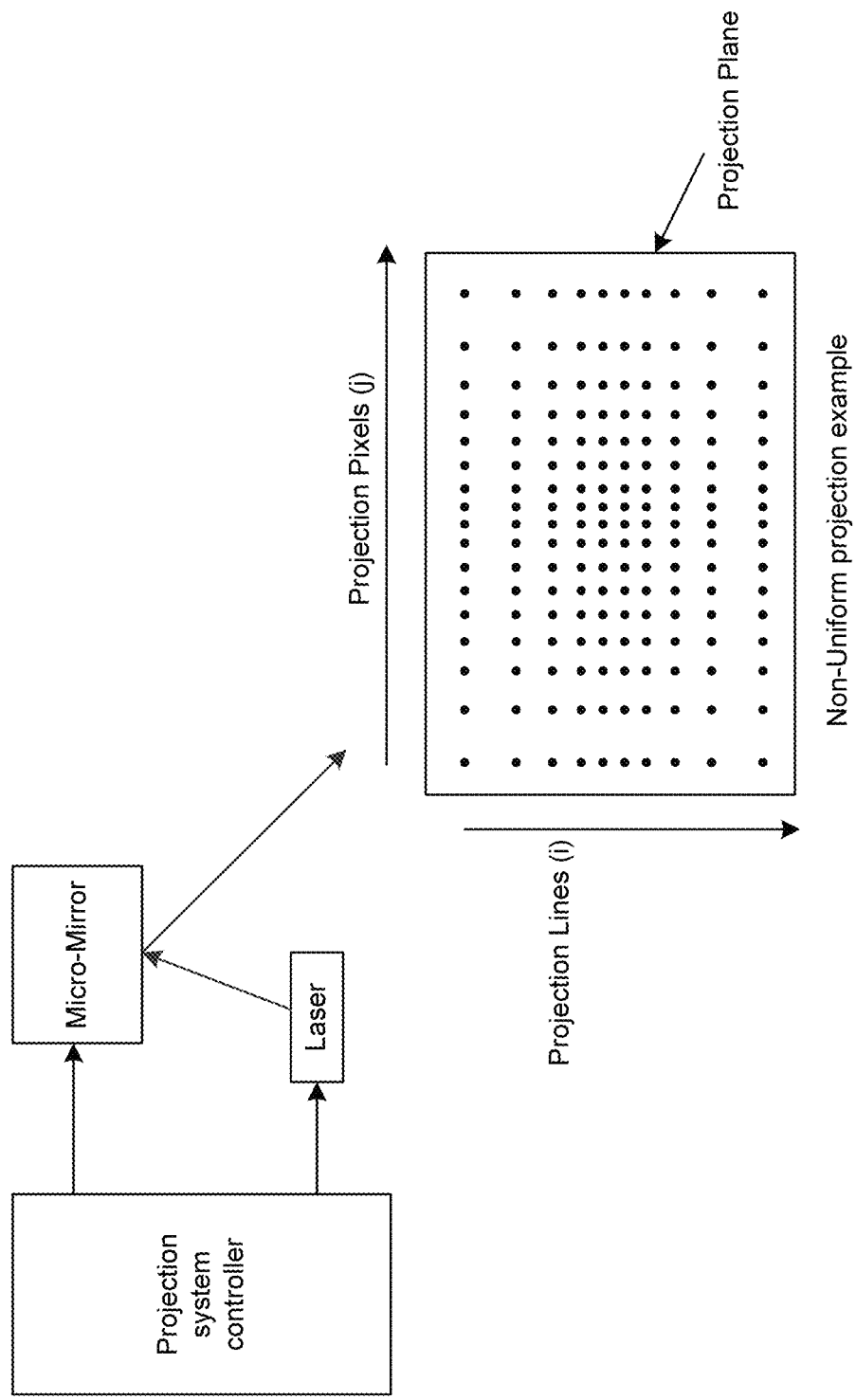
FIG. 3 aka Diagram C is a diagram of a laser projector or projection system in which the timing to drive each pixel is controlled e.g. by a projection system controller to generate uniform or non-uniform projection along the horizontal and/or vertical image axes.

FIG. 3 aka Diagram C illustrates the projection system components. The system comprises a laser light source generating a laser beam impinging on a micro-mirror that pivots in two axes. The reflected beam from the micro-mirror is projected onto a projected plane. The laser beam is modulated such that pixels are illuminated on the projected plane. The projection system controller drives the micro-mirror, and modulates the laser light source such that it turns on the beam whenever a pixel is to be illuminated to generate the requested pixel pattern—either uniform or non-uniform. The diagram illustrates non-uniform pixel and line spacing, when line index is i, and pixel index is j. The controller turns on each pixel at a given time according to a time table. This time table can be either generated locally by the controller, or loaded from an external device. Time table generation may employ logic configured to generate T_NU (i,j), time stamps (in time domain) for each pixel for non uniform projection e.g. as described herein.

Logic for Non-Uniform Projection: Example

The following method for non-uniform projection may for example be an add-on to the uniform projection process described in the co-owned patent referenced herein e.g. patent '172.

The time stamp (e.g. in a uniform projection time stamp table) is defined by clock number. The "clock" is typically a highspeed clock with cycle time DeltaT e.g. as described herein.

Typically, clock fractions are used during computation to improve accuracy. The fraction here is given as an example (for example: 1/16 clock resolution).

If
T_U(i,j) is the uniform timing table for line i (i=0, 1, . . . , L−1) and pixel j (j=0, 1, . . . , P−1).
SY(i) is the non-uniform vertical position of line i of an image to be projected (i=0, 1, . . . , L−1) in the grid of L uniformly separated lines.
example: SY(5)=10.9 means that line 5 of an image to be projected is located between lines 10 and 11 in the uniform grid, closer to line 11.
SX(i,j) is a non-uniform horizontal position of pixel number j (j=0, 1, . . . , P−1) in line i (i=0, 1, . . . , L−1) of an image to be projected. Example for accuracy: 1/16 pixel accuracy in the grid of the uniform pixels.
example: SX(1,4)=8.25 means that pixel 4 in line i should be positioned at 8.25 in the uniform horizontal grid (between uniform pixels 8 and 9, closer to pixel 8).
SX(i,j) and SY(i) functions (or tables) defines the pixel position in x and y axis, and the user may generate them according to his application or use-case.
T_NU(i,j) is the timing table (timing means high speed clock number) for pixel j in line i for non-uniform projection computed e.g. as described below in the first and second operations, from T_U(i,j), SY(i) and SX(i, j).

Then:
$1^{st}$ operation: compute time stamps, T_UXNY(i,j), for uniform horizontal position in non-uniform vertical position:
For each line i, i=0, 1, . . . , L−1 compute the uniform pixel time (in clocks) for each pixel j, j=0, 1, . . . , P−1 as follows:

$$T\_UXNY(i,j)=T\_U(\text{int}[SY(i)],j)+\text{frac}[SY(i)] \times [T\_U(\{1+\text{int}[SY(i)]\},j)-T\_U(\text{int}[SY(i)],j)]$$

Where: int[x] and frac[x] are integer and fraction parts of a number x, respectively.

$2^{nd}$ operation: compute time stamps, T_NU(i,j), for non-uniform horizontal position: For each line i, i=, 1, . . . , L−1 compute the non-uniform pixel time (in clocks) for each pixel j, j=0, 1, . . . , P−1 as follows:

$$T\_NU(i,j)=\text{round}\{T\_UXNY(i,\text{int}[SX(i,j)])+\text{frac}[SX(i,j)] \times [T\_UXNY(i,\{1+\text{int}[SX(i,j)]\})-T\_UXNY(i,\text{int}[SX(i,j)])]\}$$

Where: int[x] and frac[x] are integer and fraction parts of a number x, respectively.

Example ($2^{nd}$ Operation)

Example for T_NU(i,j) horizontal pixel time computation, before rounding, for a line i, for the first 6 pixels is shown in table form, in FIG. 7.

This process typically generates a non-uniform timing table, T_NU(i,j), from the uniform timing table, T_U(i,j) as generated according to the reference operation 50, and the non-uniform pixel position and line position requirements, SX(i,j) and SY(i) respectively that are generated by the user according to non-uniformity pixel position requirements.

This process may be used for the 3 cases defined above:
For case 1, with the same non-uniform horizontal positioning function along all lines the user provide a vector SX_UY(j); j=0, 1, . . . , P−1 that represent non uniform position of P pixels that is identical for all the lines, and SX(i,j) is generated as follows:

$$SX(i,j)=SX\_UY(j); i=0,1,\ldots,L-1; j=,1,\ldots,P-1$$

For case 2, with different non-uniform positioning function for each line, the user provides SX(i,j) and SY(i) functions (or tables). These functions define the non-uniformity in X (horizontal) and Y (vertical) direction, and may be used 'as is' by the process.

For case 3 above, with different number of pixels for each projected line, for example a vector P(i); i=, 1, . . . , L−1 should be added by the user that defines the number of pixels for each line i. The user should also add a position table SX(i,j), i=0, 1, . . . , L−1, j=0, 1, . . . , P−1, where P=max[P(i)], i=0, 1, . . . , L−1.

The process may use SX(i,j) and SY(i) matrixes provided by the user, but for each line i the process may generate only the first P(i) pixels.

Projection Brightness Adjustments Due to Non-Uniform Pixel Positioning

Every projected pixel is generated by a laser diode—see diagram C. Projected time is defined by the timing table T_U(i,j) for uniform projection, and T_NU(i,j) for non-uniform projection. Projection intensity is defined according to the pixel data. Pixel data is the pixel information driven from the video stream. Laser current is usually generated by a circuit converting the pixel data to laser current, driving the laser diode such that it emits light intensity that is proportional to the pixel data.

In case of uniform projection, all projected pixels are spread evenly (uniformly) on the projection plane. Therefore, if all pixels have the same pixel data, the laser current should be the same for all the pixels to produce the same pixel brightness in all projection areas (e.g. if the laser's on-time is the same for all pixels).

However, producing the same pixel brightness in non-uniform projection may result in a dense pixel area that appears brighter than a sparse pixel area. If an entire projected area should be illuminated with the same brightness level (this is not the case in some applications, like sensing—for example LIDAR), pixel brightness in a dense area should be reduced (dimmed) to match dense area brightness to sparser area brightness. Reducing pixel brightness in a dense area according to local pixel density may result in uniform projection brightness.

The following process may be used to adjust the pixel brightness according to local pixel density. There are several methods to measure local pixel density, and the method described in the following process is merely exemplary. The process may include all or any subset of the following operations, suitably ordered e.g. as follows:

Pixel Density at line i pixel j as PD(i,j); i=0, 1, . . . , L−1; j=0, 1, . . . , P−1 will now be defined. PD(i,j) in sparse area is greater than PD(i,j) in dense area.

PD_Y(i) is the vertical pixel density at line i:

$$PD\_Y(i)=[SY(i+1)-SY(i-1)]/2; i=1,2,\ldots,L-2$$

$$PD\_Y(0)=SY(1)-SY(0)$$

$$PD\_Y(L-1)=SY(L-1)-SY(L-2)$$

PD_X(i,j) is the horizontal pixel density at line i pixel j:

$$PD\_X(i,j)=[SX(i,j+1)-SX(i,j-1)]/2; i=0,1,\ldots,L-1; j=1,2,\ldots,P-2$$

$$PD\_X(i,0)=SX(i,1)-SX(i,0); i=0,1,\ldots,L-1$$

$$PD\_X(i,P-1)=SX(i,P-1)-SX(i,P-2); i=0,1,\ldots,L-1$$

Then: PD(i,j)=PD_Y(i)×PD_X(i,j); i=0,1, . . . , L−1; j=0,1, . . . , P−1

PD(i,j) is bigger in the sparse area compared to the dense area. Therefore, to obtain uniform projection brightness, pixels in the dense area should be dimmed. The dimming factor to get uniform brightness for each pixel (i,j) is:

$$\text{Dimming Factor}(i,j)=PD(i,j)/PD\_max; i=0,1,\ldots,L-1; j=0,1,\ldots,P-1$$

Where: PD_max=max[PD(i,j)], i=0, 1, . . . , L−1; j=, 1, . . . , P−1

Figure 4:
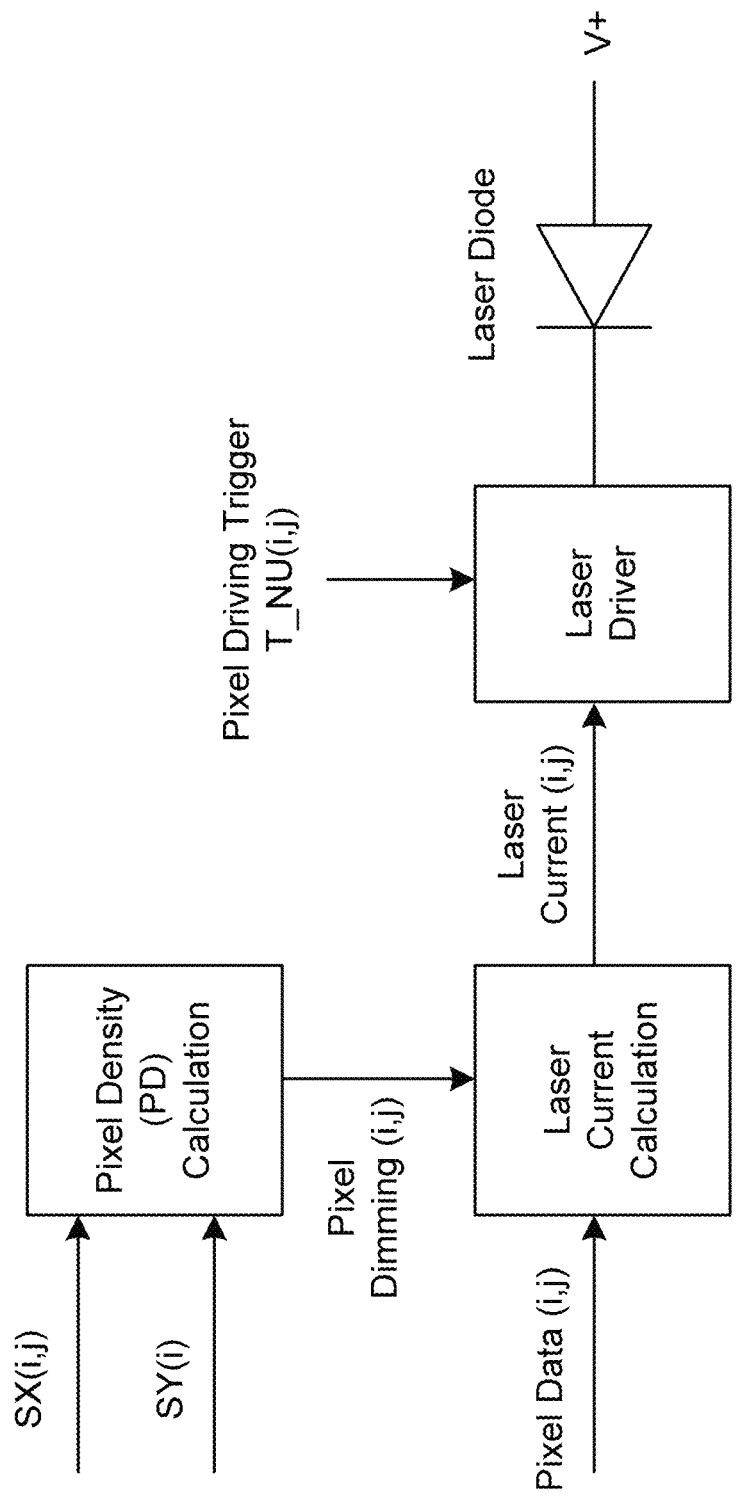
FIG. 4 aka Diagram D is a diagram illustrating use of dimming (e.g. as described in the co-owned patent '873 referred to herein) to adjust brightness of projection, to achieve uniform brightness in non uniform projection.

FIG. 4 aka Diagram D present a system or converter to achieve uniform projection brightness for non-uniform projection positioning. A laser driver circuit drives the laser diode current. For each pixel, the laser current is proportional to pixel data and to the dimming factor that is generated from the pixel density PD(i,j). PD(i,j) is computed from SX(i,j) and SY(i).

The process for non-uniform projection described herein may be an add-on to the process for uniform projection as defined in the co-owned patent (e.g. patent '172) referenced herein. The uniform projection process herein (or in the '172 patent) is operative to generate time stamps e.g. a table of time stamps T_U(i,j); i=0, 1, . . . , L−1; j=0, 1, . . . , P−1, defining times at which to project each of P pixels in each of L lines. The uniform projection process typically takes into account all the distortions of the projection on the projected plane due to geometry of the projection system—which include the micro-mirror, the impinging laser beam and the projected plane, and generate time stamps for driving the laser beam, so the projected image on the projected plane appears uniform.

The non-uniform computation includes two operations, according to certain embodiments. In the first operation the non-uniform timing table is generated from SY(i) table. In the second operation the non-uniform timing table is generated from SX(i,j). SX(i,j) and SY(i) tables can be static tables which may be generated by the user and may be stored in the system controller, and/or can be provided from time to time e.g. periodically and even for every projected frame, to change the projected objects' appearance to the viewer at any required rate.

Diagram E illustrates the system to generate pixel timing table T_NU for non-uniform projection.

The first block generates the uniform time table according to the reference. Typically, the first block receives geometry data that include the micro-mirror pivoting angles, impinging angle of the laser on the micro-mirror surface, the projection plane normal angle relative to mirror normal angle, and projection plane distance from the micro-mirror. It may also receive the projection resolution—which is the sparse grid resolution—defined by number of lines and number of pixels per line. The second and the third blocks computes the non-uniform timing table in two operations, e.g. as defined by the process, according to the positioning tables SY(i) and SX(i,j).

An example system architecture and method for non-uniform projection is now described in detail. It is appreciated that this is but one possible system architecture and design of non-uniform 2D projection by which embodiments herein may be implemented. Other methods for generating SX(i,j) and SY(i) from profile functions, and generating T_NU(i,j) from T_U(i,j) are possible.

Inputs to the process typically include all or any subset of the following:

Vertical line positioning SY(i), i=0, 1, ..., L−1
Vertical line positioning is a function defining the vertical position of each projected line i.
SY(i) function is a monotonic rising function.

$SY(0)=0; SY(L-1)=L-1; SY(i)>SY(i-1), i=1,2,...,L-1$

Horizontal pixel positioning SX(i,j), i=0, 1, ..., L−1; j=0, 1, ..., P−1:
Horizontal pixel positioning of pixel j in line i can be defined by a 2D matrix of pixel positions.
For any given line i, SX(i,j) function is typically a monotonic rising function.

$SX(i,0)>=0; SX(i,L-1)<=L-1; SX(i,j)>SX(i,j-1), j=1,2,...,P-1$

SX(i,j) matrix size is L×P position values. For more economic storage, for each line a profile function of K points can be defined (e.g., for this example, K=32), and by internal linear interpolation, the K profile points may be expanded to P points. Horizontal profile function: SPX(i,k), i=, 1, ..., L−1; k=0, 1, ..., K−1 For any given line i, SPX(i,k) function is typically a monotonic rising profile function.

$SPX(i,0)>=0; SPX(i,K-1)<=K-1; SPX(i,k)>SPX(i,k-1), k=1,2,...,K-1$

Communication package: may define information which is to be transmitted or provided, for non-uniform projection of entire frame.

$SY(i), i=0,1,...,L-1$ {size=L position values}

$SPX(i,k), i=0,1,...,L-1; k=0,1,...,K-1$ {for K=32, size=32×L position values}

Figure 6:
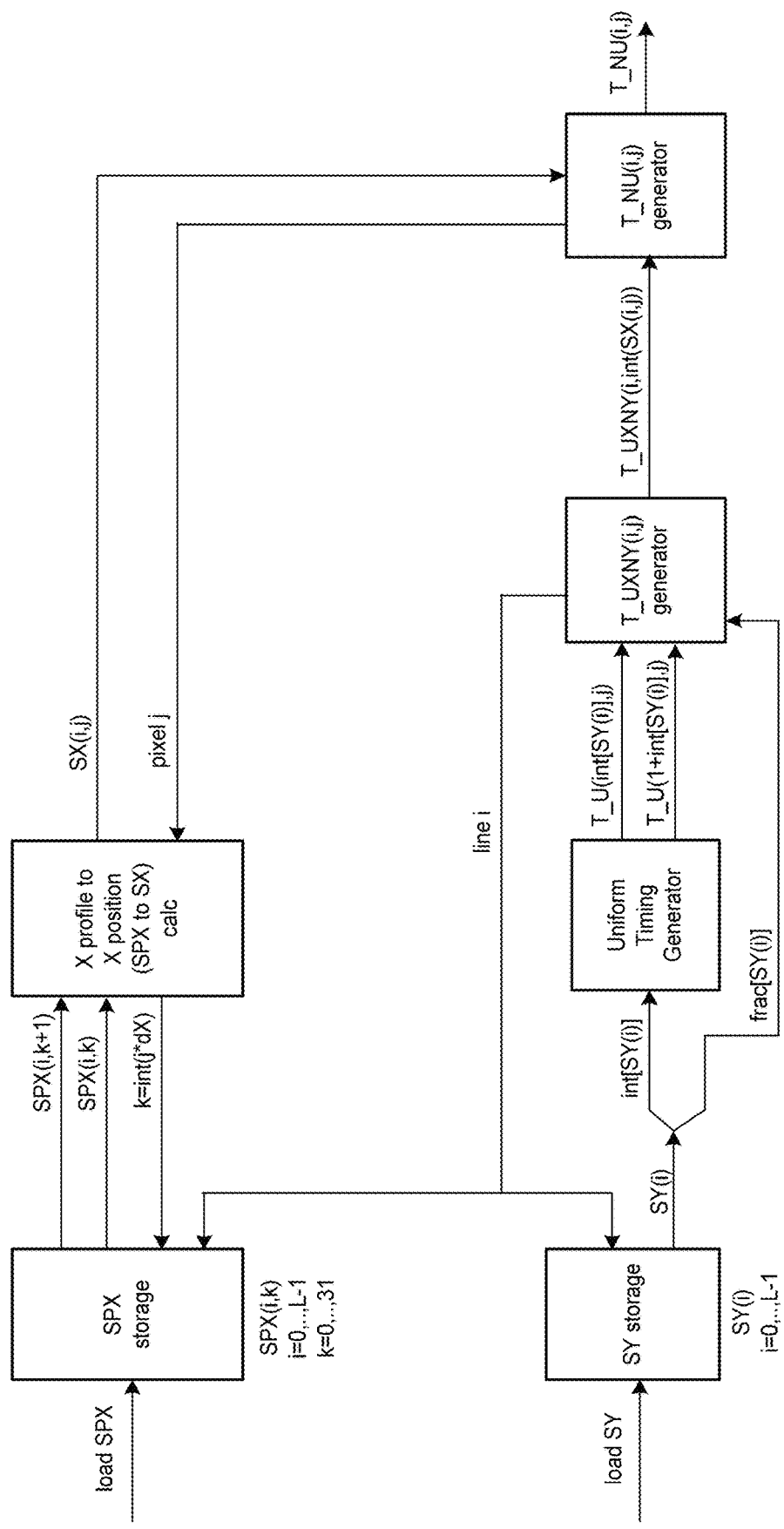
FIG. 6 aka Diagram X is an example, non-limiting real time implementation of the system of diagram E. The system of FIG. 6 illustrates real-time T_NU(i,j) computation when SY(i) represents a vertical position of projection lines, and SPX(i,k) represents a horizontal profile which may be provided for each projected line. Using a profile may reduce the data (or storage) devoted to SX(i,j).

Example: assuming SY is represented by two bytes, and SPX by one byte,
Number of bytes=32×L+2×L=34×L
For 1024 lines, 34K bytes would be used to define the Non uniform pixel positioning.
Converting Line Profile Function to Line Positioning:
For any given line i (i=0, 1, ..., L−1) the horizontal position vector may be computed e.g. from the profile line vector SPX(i,k) (k=0, 1, ..., K−1), the horizontal position vector SX(i,j) (j=0, 1, ..., P−1) may be computed, typically using linear interpolation as follows:

$dX=(K-1)/(P-1)$ $SX(i,j)=(P-1)/(K-1)*\{SPX(i,int(j*dX))+frac(j*dX)*[SPX(i,(1+int(j*dX)))-SPX(i,int(j*dX))]\}$ FIG. 6 is a diagram to illustrate example system data flow; here and in other diagrams, all or any subset of blocks illustrated may be provided, in any suitable arrangement e.g. as shown.

Figure 5:
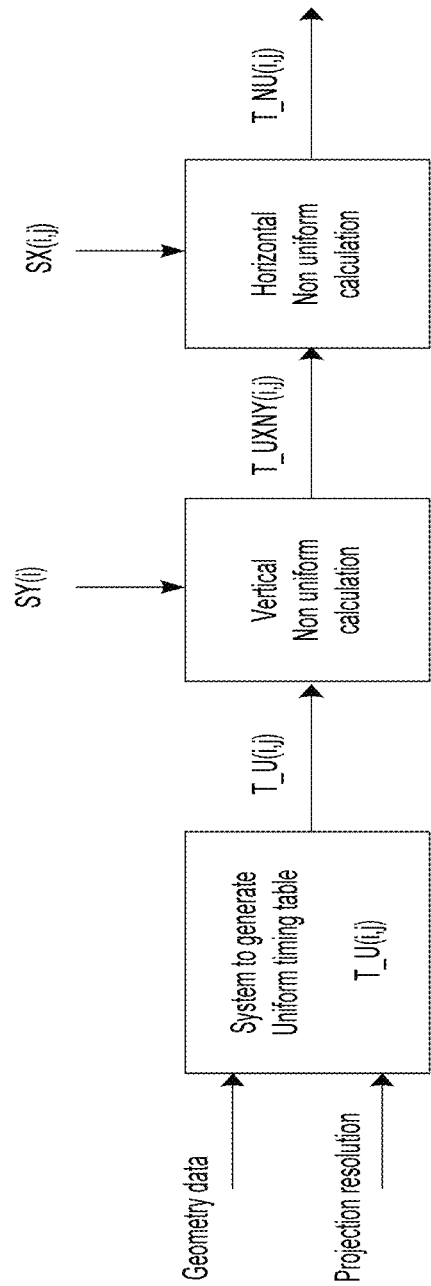
FIG. 5 aka Diagram E illustrates a system providing non-uniform projection including functionality for uniform pixel projection timing computations/algorithm followed by vertical non-uniform pixel projection timing computations followed by horizontal non-uniform pixel projection timing computations. The system of FIG. 5 typically generates timestamps T_NU, for non-uniform horizontal and vertical position/s for each pixel in each image line.

SPX(i,k) storage stores the horizontal profiles of the non-uniform lines. Line index is i (i=0, 1, ... L−1). Profile horizontal index is k, k=0, 1, ..., K−1
SY(i) storage stores the non-uniform vertical positioning function. Line index is i (i=0, 1, ... L−1)
SPX to SX converter converts line profile to line positioning. This block gets K points profile for each line and convert to P points pixel positioning. It implements the following equation for each line i:

$SX(i,j)=(P-1)/(K-1)*\{SPX(i,int(j*dX))+frac(j*dX)*[SPX(i,(1+int(j*dX)))-SPX(i,int(j*dX))]\})$ $dX=(K-1)/(P-1)$ Uniform timing generator generated 2D uniform timing stamps T_U(i,j). Line i index is replaced by line index int(SY(i)). This block generates timing stamps for lines int(SY(i)) and 1+int(SY(i))
numerical example: if for line i=10, SY(10)=19.25. This block may generate uniform time stamps for P pixels for two lines in the uniform grid: for line 19 and line 20, both are typically used by the next block: T_UXNY generator.
T_UXNY generator block generates uniform horizontal time stamps for line i. It uses the following equation:

$T\_UXNY(i,j)=T\_U(int[SY(i)],j)+frac[SY(i)]\times[T\_U(\{1+int[SY(i)]\},j)-T\_U(int[SY(i)],j)]$ Continue to the previous numerical example, for line i=10, this block gets lines 19 and 20 time stamps, and using interpolation factor 0.25 [=frac(SY(10))] it generates T_UXNY(i,j).
T_NU(i,j) block generates the final time stamps for the non-uniform projection from line
T_UXNY and from positioning SX(i,j) using the following equation:

$T\_NU(i,j)$=round $\{T\_UXNY(i,int[SX(i,j)])+frac[SX(i,j)]\times[T\_UXNY(i,\{1+int[SX(i,j)]\})-T\_UXNY(i,int[SX(i,j)])]\}$ FIG. 5 aka Diagram E illustrates a system e.g. hardware processor for generating e.g. by suitable computation as described herein, a non-uniform projection table which typically comprises a table of T_NU (i,j) values, for all pixels (i,j) in the image.

Certain embodiments seek to provide a laser projection method including all of any subset of the following operations, in any suitable order e.g. as shown:

Operation a. providing hardware e.g. as in diagram C, typically including all or any subset of:
  conventional or standard laser projection hardware typically not including any custom hardware designed to achieve projection which is non-uniform in the x direction, y direction, or both. These may include:
    a micro-mirror, pivoting about horizontal and vertical axes, with associated vertical driving circuit and horizontal driving circuit driving the mirror vertically and horizontally respectively;
    a laser light source generating a laser beam impinging on the micro-mirror projection system controller.

Operation b. providing or user-selecting a (typically non-planar) surface on which to project video or still images; the beam reflected from the micro-mirror is projected onto this surface.

Operation c. projection system controller defines when to activate the diode for each pixel e.g. as described herein with reference to diagram C.

Operation d. projection system controller defines a level or intensity of current for the laser diode for each pixel e.g. a numerical value in Amperes or any logical value that can be used by the laser driver that drives the laser diode for each pixel, e.g. as per any embodiment herein such as the embodiment of FIG. 4 aka diagram D.

Diagram D illustrates an example system providing uniform projection brightness e.g. for use-cases having non-uniform projection positioning. The laser driver circuit drives laser diode current at a timing dictated by a pixel driving trigger, T_NU(i,j). For at least one pixel e.g. each pixel, the laser current (e.g. intensity thereof) may be computed from the pixel data (e.g. RGB color component level/s) and from a dimming factor generated from pixel density PD(i,j). PD(i,j), in turn, may be computed from SX(i,j) and SY(i).

According to the embodiment of Diagram D, all or any subset of the following operations may be performed, suitably ordered e.g. as follows:

Operation D1. Compute pixel density e.g. from SX, SY values provided by end user, Operation D2. Provide pixel density and pixel data to laser current computation functionality, which like all other computation blocks and functionalities herein, may comprise a suitably configured hardware processor and is configured to compute laser current for each pixel;

Operation D3. Laser driver circuit provides each laser diode with laser current that achieves projection brightness which is uniform throughout the image;

Operations D1, D2, D3 may for example be performed by the projection system controller of FIG. 3 aka diagram C.

Any suitable method for measuring or quantifying or defining pixel density may be employed e.g. by measuring distances between a pixel and horizontal and vertical neighbor pixels thereof, and combining these distances typically using a monotonically increasing function such as a sum, which may be weighted. High pixel density is then defined by a lower value, and lower pixel density by a higher value.

Certain embodiments seek to provide a system for controlling laser drivers of lasers, which may be incorporated into optical devices such as Head Up Displays aka HUDs, laser based headlights, Lidars, etc. These devices may seek to provide laser images including at least one laser image whose pixels are non-uniformly distributed. The system typically comprises all or any subset of:

a location-to-time converter (software or firmware) which translates the desired pixel location data into time stamps and, when embedded into an optical device which incorporates a laser having a laser driver, communicates the timestamps to the laser driver, and/or memory configured to store desired pixel location data; and/or an API which allows an end-user/manufacturer of the optical device to upload desired pixel location data into the memory (and, optionally, a graphic user interface, aka GUI, which facilitates this process and may be supplied externally to, or separately from, the system of the present invention, e.g. as a service file).

The system may operate in conjunction with Driver and control IC for controlling a scanning mirror associated with the laser.

Example

For example, MAR2100 is a Driver and control IC for Maradin's MAR1100 dual-axis MEMS based scanning mirror. MAR2100 is targeted for miniature laser projectors and laser steering applications. MAR2100 drives and controls Maradin's MAR1100 dual axis scanning mirror and generates the timing signals to synchronize the laser module through the Host, aka Data Manipulator. As MAR1100 scanner has two uncoupled actuators, one for horizontal scan and one for vertical scan, MAR2100 controller IC supports both drivers.

An example of a scanning mirror (e.g. 2D mems scanner mirror) which may be associated with a laser (which may include plural (e.g. r g and b) laser diodes associated with optics) is the MAR1100 which includes a dual-axis MEMS based scanning mirror targeted for miniature laser projectors and laser steering applications, which includes electro-static and electro-magnetic actuators.

System firmware may have Mirror-To-Laser synchronization and Data Flow functionality e.g. the real-time Mirror-To-Laser synchronization provided by MAR3102 which interfaces between the laser driver and the MAR2100. This yields stable laser modulation timing at different temperatures and scanning conditions and provides API based GUI FOV control, facilitating pixel adaptive timing and real-time data flow.

The firmware may include or be based on www.Maradin.co.il's MAR3102 or DM3102 component.

The firmware may include a dimmer feature which may comprise any embodiment described in co-owned U.S. Pat. No. 10,277,873 available here: patents.justia.com/patent/10277873.

Certain embodiments include use of instances of the above system, by a population of manufacturers of many different optical devices.

Optionally, the memory may store initial aka default desired pixel location data which can be replaced by new desired pixel location data via the API.

Typically, each system includes desired pixel location data ready-stored in memory and/or an API allowing desired pixel location data to be uploaded into memory. If data is ready stored, and also an API is provided, the default or initial desired pixel location data can be replaced by new pixel location data in a calibration process. According to some embodiments, a few instances or copies of the system are provided to an optical device manufacturer for calibration purposes, and these copies typically include both default pixel location data ready-stored in memory and an API. Subsequent mass-produced instances or copies of the system may include (a) calibration-generated desired pixel location data rather than the default desired location data, and optionally (b) an API—especially if the mass-produced instances of the system, incorporated into respective mass-produced optical devices, are going to be calibrated or fine-tuned, or verified individually.

It is appreciated that the memory need not store default desired pixel location data. Use of default desired pixel location data is one method for factory calibration which includes generating desired pixel location data for a given optical device. Other factory calibration methods have generated this desired pixel location data for a given optical device independently, rather than relying on e.g. modifying, pre-supplied default desired pixel location data.

Location-to-Time Converter

Input typically comprises desired pixel location data (e.g. pixel map, function, table, matrix, graph, or, more generally, any suitable indication of desired distances between laser pixels or laser dots). For example, the pixel location data may include a "pixel map" or an absolute location of at least one pixel, and relative locations of all other pixels e.g. by indicating the distances between horizontally adjacent pixels in each row and distances between rows, or by indicating the distances between vertically adjacent pixels in each column and distances between columns, or any other indication of desired pixel locations. Alternatively or in addition, the desired pixel location data may include all or any subset of coordinates of $1^{st}$ pixel in each horizontal row of the image, distances between each adjacent pair of pixels in each horizontal row, location of last pixel in each horizontal row, total number of pixels in all horizontal rows, number of pixels per horizontal row, distance between each adjacent pair of horizontal rows, total number of horizontal rows, and so forth.

Output typically comprises time stamps at which to activate laser driver, typically the laser driver is active at these points in time and is off (inactive) at all other points in time.

Factory Calibration of Optical Devices

Typically, the system of the present invention has at least one default set of desired pixel location data which is used unless or until a system end-user or optical device manufacturer uploads (e.g. pre-loads, or in real time) alternative pixel location data (e.g. pixel map, function such as a function y=f(x) e.g. expressing vertical pixel position y as a function of horizontal pixel position x, table, matrix, graph).

For example, the (or one of the) default set/s of desired pixel location data may comprise a pixel map in which the pixels are uniformly distributed, both vertically and horizontally.

The system of the invention is typically provided to manufacturers of optical devices as a netlist, or as compiled code. The manufacturer may then, in the factory, calibrate the system. To do this, the manufacturer may incorporate the system of the invention into her or his optical device, project a laser image e.g. onto the factory wall or screen or any suitable target such as directly into a camera, using the optical device whose laser driver is controlled by the system herein whose location-to-time converter translates the default pixel location data into time stamps. The laser image may include, say, 400×600 pixels, or 1000×2000 pixels (for HD technology).

The manufacturer inspects the resulting laser image, perhaps using suitable measurement devices, such as a camera or PSD. (en.wikipedia.org/wiki/Position_sensitive_device) which is operative to measure a position of a light spot in one or two-dimensions on a sensor surface (rather than projecting onto a physical surface e.g.). The PSD may for example generate a pixel map of the laser image on a factory wall or other suitable surface, typically superimposed onto a grid or image of a grid (a physical or virtual grid; it is appreciated that if the image is projected directly onto the camera or PSD, then the camera's pixels constitute the grid. The manufacturer may compare the output of the PSD, to a set of desired pixel location data, to determine whether and how the de facto image, as measured by the PSD, deviates from the desired pixel location data. For example, if a given pixel i,j is, as projected, 2 cm right of its desired location (e.g. due to artifacts of the optical device), the grid is used to determine which pixel this is (say, a pixel i, j whose i=5, j=218) and then, pixel 5, 218 in the default pixel location data is translated 2 cm to the left.

Accordingly, the manufacturer may decide to generate and upload, via the user interface, alternative pixel location data. The manufacturer can then re-activate his optical device, this time to project a laser image using time stamps derived, by the software, from the alternative pixel location data that the manufacturer has uploaded. The manufacturer may again inspect the resulting laser image, and if still not satisfactory, may again generate further alternative pixel location data, and so forth, until, by a trial and error process, a suitable set of desired pixel location data has been generated and uploaded. The optical device is then deemed calibrated and ready to leave the factory.

According to certain embodiments, the system has plural, optical-device specific, default sets of desired pixel location data. For example, the system may have one set of desired pixel location data, earmarked for laser headlights, in which central pixels are dense, whereas peripheral pixels are sparse. However, different laser headlight manufacturers may upload a modified version of the set of desired pixel location data, earmarked for laser headlights. For example, the default set of desired pixel location data, earmarked for laser headlights, may, in a particular optical device, due to some artifact of the optical device e.g., perhaps, distortions introduced by the transparent housing that encases the headlights, result in an image in which the dense pixels are not exactly centered, but instead are skewed to the left. In such cases, the manufacturer may upload an improved (for her or his optical device) set of desired pixel location data, which restores the dense pixel area to the center.

The output of the calibration process may be uploaded e.g. via a suitable API to the system of the present invention. The uploaded data may include the desired pixel location data used by the location-to-time-stamp converter described herein and/or may serve as input for method 1 described herein.

To give another example, the system may have set/s of desired pixel location data which is/are earmarked for smart glasses. This set may mimic the distribution of receptors in the human eye, e.g. the distribution of cones within the human eye (typically concentrated in the periphery) or the distribution of rods (typically absent in the periphery, but dense elsewhere).

The following methods 1-13 may be used as methods of operation for the location-to-time converter, or may be used standalone.

Method 1: a 2d image projection method comprising all or any subset of the following operations, suitably ordered e.g. as follows:

projecting 2D images on m-dimensional surfaces using a laser beam and a micro-mirror pivoting in two axis x and y, where x is the pivoting mirror's high speed axis presenting a projected line and y is the pivoting mirror's lower speed axis that moves the projection from line to line, including activating the laser at times defined by time stamps to project at least one image's pixels onto a surface, thereby to yield a projected image which is non-distorted;

and, before the projecting, determining pixel timing including generating a matrix of the time stamps, the determining including:

receiving geometry data e.g. desired pixel location data and/or projection resolution data and generating a uniform timing table;

performing a vertical non-uniform computation which receives the uniform timing table, and SY data which includes non-uniform vertical positions of image lines and, accordingly, computes time stamps, T_UXNY(i,j), for uniform horizontal position in a non-uniform vertical position; and performing a horizontal non-uniform computation which receives the time stamps, T_UXNY(i,j) and SX data, including non-uniform horizontal positions of image lines and, accordingly, computes time stamps, T_NU, for non-uniform horizontal position for each image line.

Method 2. A method according to any preceding method, with a non-uniform projection in X direction which is an identical non-uniform function for all the lines.

Method 3. A method according to any preceding method, with a non-uniform projection in X direction which is a different non-uniform function for every line.

Method 4: A method according to any preceding method, with a non-uniform projection in X direction which is either an identical or different non-uniform function for every line and changes from frame to frame.

Method 5: A method according to any preceding method, with a non-uniform projection in Y direction which is a different non-uniform function for every frame.

Method 6: A method according to any preceding method, without reduction in original image resolution.

Method 7: A method according to any preceding method, which is operative to increase brightness at a specific area.

Method 8: A method according to any preceding method, with a brightness uniformity correction.

Method 9: A method according to any preceding method, wherein pixel brightness is adjusted to yield uniform projection brightness.

Method 10: A method according to any preceding method, wherein individual pixel brightness is adjusted to be less in pixel-dense areas than in pixel-sparse areas, wherein adjustment is configured to yield uniform projection brightness in both pixel-dense and pixel-sparse portions of the projection area.

Uniform image brightness is typically provided by providing an output which represents a level (e.g. in ampere) or intensity of current, which is to be delivered by the laser driver to the laser at each time stamp, so as to ensure uniform laser image brightness, despite uneven pixel distribution (to prevent laser image portions which are densely populated with pixels, from appearing brighter than laser image portions which are sparsely populated with pixels, for use-cases in which such uneven brightness is undesirable, and uniform brightness, across all dense and sparse areas, is desirable).

Typically, the user interface includes a "uniform brightness" check box. If the user checks this, or otherwise requests uniform brightness, the "uniform brightness" method is used, to ensure uniform laser image brightness, despite uneven pixel distribution.

Or, according to other embodiments, the user interface provides a menu of optical devices (e.g. pico-projector, Laser headlights, Head Up Display, Smart glasses, Lidar system) and prompts the user to select the optical device which the system of the present invention is to serve. Responsively, the system may automatically select a set of desired pixel location data which is earmarked for the selected optical device and/or may automatically decide whether or not to active the uniform brightness option (say: don't activate this option if the optical device is either Headlamps or LiDAR, do activate otherwise).

A non-uniform projection method for projecting an image, where distances between horizontally and/or vertically consecutive pixels are not uniform, is now described; the method is advantageous in yielding a total projected area with a uniform brightness level. This method may be used standalone or may be a method operation for the time stamp-to-laser driver current intensity converter described herein.

The method may include any of the following embodiments, each of which includes all or any subset of the operations described, in any suitable order e.g. as per below:

Embodiment 101

A non-uniform projection method for projecting an image, including a matrix of pixels i,j, on a total projected area or surface (e.g. projection plane), such that distances between horizontally and/or vertically consecutive pixels are not uniform, thereby to provide first and second areas within the total projected area, wherein the first areas are more sparsely populated with pixels than the second areas which are more densely populated with pixels, the method comprising:

illuminating the total projected area with a uniform brightness level, including providing levels of laser current for pixels in the first, sparsely populated, areas which are higher than levels of laser current for pixels in the second, densely populated, areas, which are dimmer.

If all pixels are projected at the same brightness level, densely populated areas typically appear brighter than sparse areas. However, uniform projection brightness may be provided e.g. by controlling the laser current, such that laser current at pixels in sparsely populated areas is higher than laser current in pixels at densely populated areas. Typically, pixel brightness is proportional to laser current. The term "dimming" is intended to include controlling the laser current by controlling dimming of local pixel regions e.g. individual pixels, according to local pixel density.

Embodiment 102

The method of embodiment 101 and also comprising providing SX(i,j) and SY(i) data e.g. from an end-user, where SX(i,j)=a representation e.g. matrix representing a horizontal position of pixel j in line i, SY(i)=a representation e.g. vector representing a vertical position of line I.

Diagram B is an example of this function for uniform and non-uniform projection.

Embodiment 103

The method of embodiment 101 wherein plural user-selectable modes of operation of the method are provided including one mode in which illumination of the total projected area with a uniform brightness level is desired by the user, and another mode in which illumination of the total projected area with a uniform brightness level is not desired by the user.

Embodiment 104

The method of embodiment 101 wherein the method also comprises:

computing a dimming factor as a function of local pixel density in at least one portion of the total projected area; and/or controlling laser current for at least one individual pixel according to the dimming factor.

For example, levels of laser current for each pixel in the portion may be multiplied by the dimming factor.

Embodiment 105

The method of embodiment 104 wherein the dimming factor for a pixel (i,j) is

Dimming factor$(i,j)=PD(i,j)/PD\_\max$ where: $PD(i,j)$ is the local pixel density for each pixel (i,j), and PD_max is the largest $PD(i,j)$ value over all pixels in the image Embodiment 106

The method of embodiment 105 wherein $PD(i,j)$, is a combination of horizontal Pixel Density PD_X(i,j) at line i pixel j, and vertical pixel density PD_Y(i) at line I which may be computed according to the following formula:

$PD(i,j)=PD\_X(i,j) \times PD\_Y(i)$

Embodiment 107

The method of embodiment 106 wherein PD_Y(i), the vertical pixel density at line i, is computed as:

$$PD\_Y(i) = [SY(i+1) - SY(i-1)]/2$$

where SY(i)=a function representing a vertical position of line I.

Embodiment 108

The method of embodiment 107 wherein PD_Y(0) is computed as SY(1)−SY(0) and PD_Y(L−1) is computed as SY(L−1)−SY(L−2), where L may be the number of lines in a projected image.

Embodiment 109

The method of embodiment 106 wherein PD_X(i,j), the horizontal pixel density at line i pixel j, is computed, for each pixel by averaging SX(i,j+1)−SX(i,j−1)]/2
where SX(i,j)=a function representing a horizontal position of pixel j in line i.

Embodiment 110

The method of embodiment 109 wherein PD_X(i,0) is computed as SX(i,1)−SX(i,0) for at least each line i, and wherein PD_X(i, P−1) is computed as SX(i,P−1)−SX(i,P−2) for each line i.

Embodiment 111

The method of embodiment 104 wherein a level of laser current used to generate pixel (i,j) is proportional to the pixel data and to a dimming factor, which reflects local pixel density adjacent to the pixel i,j.

It is appreciated that pixel data may comprise color values e.g. RGB values of pixels. Dimming can be achieved by multiplying each pixel RGB value by a dimming factor e.g.:

Pixel Data after dimming (i,j)=Pixel Data (i,j)×Dimming factor (i,j)

Embodiment 112

The method of embodiment 1 and wherein, for each line i only P(i) pixels are generated, and subsequent pixels in line i are not generated.

It is appreciated that each line may have the same number of pixels e.g. P pixels. Typically however the system also supports lines having a different number of pixels per line in which case P(i), i=0, 1, . . . , L−1 may define how many pixels are included in each line i.

According to certain embodiments, the laser driver current intensity values are fed directly to the laser driver. Alternatively, however, the laser driver current intensity values are not fed directly to the laser driver. Instead, these values may go to all or any subset of 3 destinations or computational modules: pixel on-time (e.g. pixel width), laser driver current (e.g., gain) and data combination (e.g. deviation or division of RGB combination), corresponding to the (Pixel Width, Gain_CF, DIV_R) data described in co-owned patent document U.S. Pat. No. 10,277,873 patents.google.com/patent/US10277873B2/en e.g. as shown in FIG. 1b of the co-owned patent, the disclosure of which is hereby incorporated by reference in its entirety.

In order to achieve uniform brightness (e.g. if the user selected that option) the system may dim some pixels, e.g. using any embodiment described in co-pending patent document U.S. Pat. No. 10,277,873, to achieve a desired lower intensity in some pixels.

Alternatively, the system may make some pixels brighter, rather than making others dimmer. Thus, uniform brightness, if this functionality is active, may be achieved in any suitable manner, such as but not limited to bringing all pixels down to the lowest brightness level, or bringing all pixels up to the highest brightness level.

If the above co-owned patent '873 is used to dim some pixels, typically, the laser driver current intensity values or other outputs of the computational methods herein are post-processed at all or any subset of the above destinations e.g. before being provided to the laser driver.

As described in the above co-owned patent '873, "any one, any two or all three of the following elements or components or control parameters (or other suitable laser driver control parameters) can independently be used, to control data current to the laser diode, thereby to provide controlled dimming of a laser-based (e.g. laser beam-generated) display:

a) Laser pixel width
b) Laser driver Data Reference DAC (Digital to Analog Converter) gain
And optionally also—
c) Data value division.

Each of the above elements has a limited attenuation ratio which prevents that element, taken alone, from yielding certain high dynamic ranges of dimming. However, multiplying these three attenuations, or 2 out of 3 from among them, yields a range for system dimming which is wider than the ranges that might be provided from each of the elements taken alone."

"the parameters used by way of example herein, . . . achieve a dimming ratio of 1:3200, [but] a much higher dimming ratio such as but not limited to, say, 1:12000 may be achieved e.g. by suitably increasing clock frequency and/or using higher resolution gain control data e.g. 10 bit data rather than 8 bit data".

Thus, using the teachings of the above co-owned patent '873 allow a 256-level (8-bit) laser to yield higher industry standards e.g. automobile industry standards (e.g. for laser headlights) of, say, 1:4000, e.g. by manipulating or postprocessing outputs of the process herein, e.g. as per the teachings of the above co-owned patent, before the outputs are provided to the laser driver.

In particular, the firmware described herein may include a dimmer feature which may comprise any embodiment described in co-pending patent document U.S. Pat. No. 10,277,873.

Figure 8:
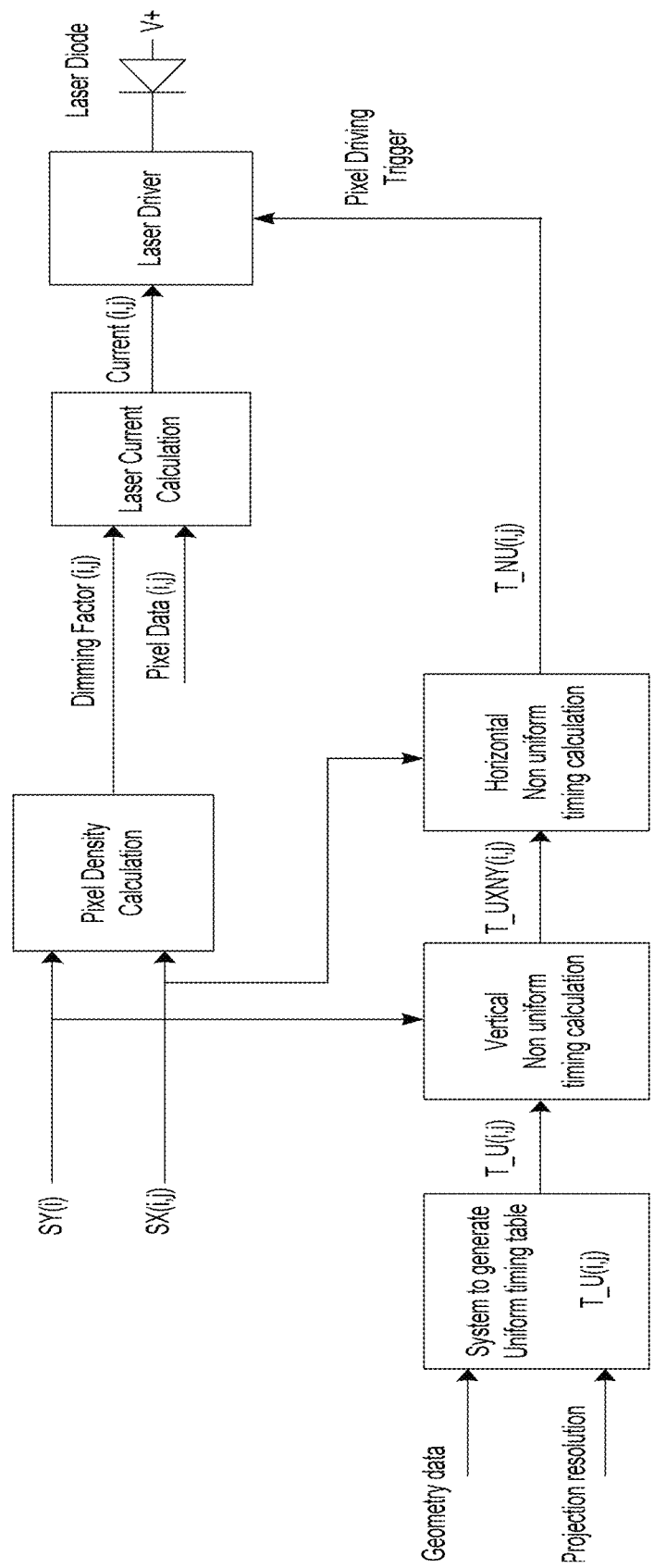
FIG. 8 is a system diagram, according to an example implementation, providing both conversion of desired-pixel-location to time, and (typically selectable) brightness adjustment (pixel position-to-laser driver current conversion). The system of FIG. 8 typically yields time stamps to control the timing at which to drive each pixel, and may yield brightness control (e.g. "dimming"), which controls laser current for each pixel.

FIG. 8 is a system diagram providing both conversion of desired-pixel-location to time, e.g. as per any embodiment described herein and brightness adjustment e.g. to yield uniform brightness, again as per any embodiment described herein. However, it is appreciated that the conversion (or the brightness adjustment) may also be provided as standalone.

According to certain embodiments e.g. for certain use cases, brightness may be derived from the pixel distribution. According to other embodiments e.g. for other use cases, pixel distribution may be derived from brightness.

Certain embodiments seek to generate time stamps and/or brightness values which each, typically independently, control a laser driver.

Typically, the time stamps control the timing at which to drive each pixel, and the brightness control ("dimming"), if provided, controls laser current for each pixel. It is shown in FIG. 8.

It is appreciated that terminology such as "mandatory", "required", "need" and "must" refer to implementation choices made within the context of a particular implementation or application described herewithin for clarity and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order, any technical effects brought about by any or all of the operations of any of the methods shown and described herein, when performed in any suitable order, any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein may be deployed in a cloud environment. Clients e.g. mobile communication devices such as smartphones may be operatively associated with, but are external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may for example comprise changing the state or condition, or may more generally cause any outcome which is technically advantageous given the state or condition or data, and/or may prevent at least one outcome which is disadvantageous given the state or condition or data. Alternatively or in addition, an alert may be provided to an appropriate human operator or to an appropriate external system.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment, or in a certain order, may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling, such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example, and, instead, embodiments of the present invention may be implemented, say, as a smartphone SDK; as a hardware component; as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network or is tethered directly or indirectly/ultimately to such a node).

The invention claimed is:

1. A system for controlling laser drivers of lasers, incorporated into optical devices which seek to provide e.g. project laser images including at least one laser image whose pixels are non-uniformly distributed,
the system comprising:
memory which stores desired pixel location data; and
a location-to-time converter (a hardware processor configured by software or firmware) which is configured to translate said desired pixel location data into time stamps and, when embedded into an optical device which incorporates a laser having a laser driver, communicates said time stamps to the laser driver.

2. The system of claim 1 and also comprising an API which allows an end-user/manufacturer of the optical device to upload desired pixel location data into the memory.

3. The system of claim 1 wherein the location-to-time converter is configured to support projecting 2D images on in-dimensional surfaces using a laser beam and a micro-mirror pivoting in two axes x and y, where x is the pivoting mirror's high speed axis presenting a projected line and y is the pivoting mirror's lower speed axis that moves the projection from line to line, including activating the laser at times defined by time stamps to project at least one image's pixels onto a surface, thereby to yield a projected image which is non-distorted, and wherein the location-to-time converter is configured for determining pixel timing according to which pixels are projected.

4. The system of claim 1 wherein the system also comprises functionality configured to compute pixel density from pixel position and a pixel density-to-laser driver current intensity converter (hardware processor configured by software or firmware) which is configured to translate pixel data and said pixel density into laser driver current intensity values which control the current intensity generated by the laser driver at each timestamp.

5. The system of claim 1 wherein the memory stores at least one default set of desired pixel location data, thereby to facilitate trial-and-error based calibration.

6. The system of claim 5 and also comprising a user interface which includes a virtual button via which the end-user determines whether the time stamp-to-laser driver current intensity converter should or should not be activated.

7. The system of claim 6 wherein the time stamp-to-laser driver current intensity converter is configured for projecting an image, including a matrix of pixels I,j, on a total projected area or surface (e.g. projection plane), such that distances between horizontally and/or vertically consecutive pixels are not uniform, thereby to provide first and second areas within the total projected area, wherein said first areas are more sparsely populated with pixels than said second areas which are more densely populated with pixels, and wherein the total projected area is, e.g. selectably, illuminated with a uniform brightness level, including providing levels of laser current for pixels in the first, sparsely populated, areas which are higher than levels of laser current for pixels in the second, densely populated, areas, which are dimmer.

8. The system of claim 1 wherein the optical devices includes at least one of the following group of optical devices:
pico-projector
laser headlights, e.g. for cars
Head Up Display e.g. for humans driving vehicles or operating machinery
Smart glasses
A Lidar system.

9. The system of claim 3 wherein said determining pixel timing includes generating a matrix of said time stamps, said determining including:
receiving geometry data and projection resolution data and generating a uniform timing table;
performing a vertical non-uniform computation which receives said uniform timing table, and SY data which includes non-uniform vertical positions of image lines and, accordingly, computes time stamps, T_UXNY(i,j), for uniform horizontal position in non-uniform vertical position.

10. The system of claim 9 wherein said determining pixel timing also includes performing a horizontal non-uniform computation which receives said time stamps, T_UXNY(i,j)

and SX data, including non-uniform horizontal positions of image lines and, accordingly, computes time stamps, T_NU (i,j), for non-uniform horizontal position for each pixel in each image line.

11. The system of claim 4 wherein the laser driver current intensity values are fed directly to the laser driver.

12. A method for controlling laser drivers of lasers, incorporated into optical devices which seek to provide laser images including at least one laser image whose pixels are non-uniformly distributed, the method comprising:
providing memory which stores desired pixel location data; and
providing logic configured for translating said desired pixel location data into time stamps and, when said logic is embedded into an optical device which incorporates a laser having a laser driver, for communicating said time stamps to the laser driver.

13. A computer program product, comprising a non-transitory tangible computer readable medium having computer readable program code embodied therein, said computer readable program code adapted to be executed to implement a method for controlling laser drivers of lasers, incorporated into optical devices which seek to provide laser images including at least one laser image whose pixels are non-uniformly distributed, the method comprising:
providing memory which stores desired pixel location data; and
providing logic configured for translating said desired pixel location data into time stamps and, when said logic is embedded into an optical device which incorporates a laser having a laser driver, for communicating said time stamps to the laser driver.

14. The system of claim 3 wherein said location-to-time converter configured for determining said pixel timing is configured for generating time stamps to be used to determine a time for projecting a desired non uniform vertical position SY(i), where pixels are spread uniformly along a horizontal direction, thereby to yield interim time stamps at which to project each of P pixels in each of L lines, for non-uniform vertical projection according to SY(i) with uniform horizontal projection.

15. The system of claim 14 wherein final time stamps T_NU(i,j) for each pixel j in line i, are derived from at least one of a function e.g. an SX(i,j) function which defines pixel j positions in line i and said interim time stamps e.g. T_UXNY(i,j).

16. The system of claim 10 wherein said SX data yields L×P position values where L is the number of lines, and wherein said SX data is stored in a compressed form.

17. A system according to claim 1, providing Non uniform projection in an X direction which includes an identical non-uniform function for all lines in at least one laser image.

18. A system according to claim 1, providing a non-uniform projection in X direction which includes a different non-uniform function for every line in at least one laser image.

19. A system according to claim 1, providing a non-uniform projection in X direction wherein said at least one laser image includes plural images defining plural frames respectively and wherein an identical non-uniform function or different non-uniform functions is/are employed for every line in at least one laser image which change/s from frame to frame.

20. A system according to claim 1, providing a non-uniform projection in a Y direction which includes a different non-uniform function for every fame.

21. A system according to claim 1 wherein, selectably, at least one laser image is projected at a uniform brightness, such that all areas of the image appear uniformly bright regardless of pixel density, the system being configured for at least one of the following operations:
achieving uniform brightness by providing an increased brightness level for at least one pixel in the at least one laser image; and
achieving uniform brightness by dimming at least one pixel in the at least one laser image.

* * * * *

UNITED STATES PATENT AND TRADEMARK OFFICE
CERTIFICATE OF CORRECTION

PATENT NO. : 11,606,540 B2
APPLICATION NO. : 16/936055
DATED : March 14, 2023
INVENTOR(S) : Matan Naftali et al.

Page 1 of 1

It is certified that error appears in the above-identified patent and that said Letters Patent is hereby corrected as shown below:

In the Claims

In Claim 3, Column 32, Line 6, please delete "in-dimensional" and insert --m-dimensional--.

In Claim 20, Column 34, Line 28, please delete "fame" and insert --frame--.

Signed and Sealed this
Fourth Day of July, 2023

Katherine Kelly Vidal
*Director of the United States Patent and Trademark Office*